US010555227B2

(12) United States Patent
Sang et al.

(10) Patent No.: US 10,555,227 B2
(45) Date of Patent: Feb. 4, 2020

(54) FLEXIBLE MACRO-ASSISTED USER-PLANE ARCHITECTURE WITH MILLIMETER-WAVE SMALL CELLS

(71) Applicant: MEDIATEK INC., Hsinchu (TW)

(72) Inventors: Aimin Justin Sang, San Diego, CA (US); Yu-Syuan Jheng, Taipei (TW); Yuanyuan Zhang, Beijing (CN)

(73) Assignee: MEDIATEK INC., Hsin-Chu (TW)

( * ) Notice: Subject to any disclaimer, the term of this patent is extended or adjusted under 35 U.S.C. 154(b) by 104 days.

(21) Appl. No.: 15/697,636

(22) Filed: Sep. 7, 2017

(65) Prior Publication Data

US 2017/0374589 A1 Dec. 28, 2017

Related U.S. Application Data

(63) Continuation of application No. PCT/CN2015/077434, filed on Apr. 24, 2015.

(51) Int. Cl.
*H04W 4/00* (2018.01)
*H04W 36/04* (2009.01)
(Continued)

(52) U.S. Cl.
CPC ........... *H04W 36/04* (2013.01); *H04W 16/32* (2013.01); *H04W 76/15* (2018.02); *H04W 84/042* (2013.01)

(58) Field of Classification Search
CPC .................................................. H04W 36/04
See application file for complete search history.

(56) References Cited

U.S. PATENT DOCUMENTS

2010/0293284 A1* 11/2010 Song ............... H04W 48/08
709/230
2014/0307556 A1* 10/2014 Zhang ............. H04L 45/302
370/236
(Continued)

FOREIGN PATENT DOCUMENTS

CN 103731900 A 12/2013
EP 2757854 A1 1/2013
(Continued)

OTHER PUBLICATIONS

International Search Report and Written Opinion of International Search Authority for PCT/CN2015/077434 dated Jan. 27, 2016 (11 pages).

(Continued)

*Primary Examiner* — Omoniyi Obayanju
(74) *Attorney, Agent, or Firm* — Imperium Patent Works; Zheng Jin; Helen Mao (57) ABSTRACT

Millimeter-wave (mmWave) band communication is a very promising technology for 5G small cells. In practice, such a new system will coexist with legacy or evolved microwave band systems, such as E-UTRAN LTE macro-cell cellular systems, for a long time to come. Considering the typical scenarios where a macro cell offers umbrella coverage for clusters of small cells, several user plane (U-plane) architectural choices of macro-assisted 5G mmWave systems from both UE and network's perspectives are evaluated. The proposed On-demand Reconfiguration U-Plane Architecture (ORUA) for Macro-assisted Millimeter Wave (mmWave) small cells is designed to meet 5G expectations of dense deployment of small cells and UEs and beamformed intermittent Gbps links.

22 Claims, 7 Drawing Sheets

(51) Int. Cl.
*H04W 76/15* (2018.01)
*H04W 16/32* (2009.01)
*H04W 84/04* (2009.01)

(56) References Cited

U.S. PATENT DOCUMENTS

2015/0365867 A1 12/2015 Worrall et al. ............... 455/410
2016/0157155 A1 6/2016 Chiba et al. ................. 455/436

FOREIGN PATENT DOCUMENTS

| WO | WO2014113686 A2 | 1/2013 | | |
|---|---|---|---|---|
| WO | WO2014179982 A1 | 5/2013 | | |
| WO | WO2015002404 A1 | 7/2013 | | |
| WO | WO2015032565 A1 | 9/2013 | | |
| WO | WO-2014113686 A2 * | 7/2014 | ............ | H04W 16/32 |

OTHER PUBLICATIONS

EPO, search report for the EP patent application 15889548.2 dated Apr. 24, 2018 (11 pages).

* cited by examiner

SETUP 1: S-GW TO SBS + S-GW TO MBS TO UE WITH OR WITHOUT MBS-BASED BEARER SPLIT

FIG. 4

SETUP 2: LOCAL TRAFFIC OFFLOADED FROM MBS

FIG. 5

SETUP3: A SINGLE UE WITH DUAL
CONNECTIONS FOR THE SAME DATA
FOR SHO OR COMP

FIG. 6

UE1 HAVING THREE SIMULTANEOUSLY
ACTIVE U-PLANE SETUPS

FLEXIBLE MACRO-ASSISTED USER-PLANE ARCHITECTURE WITH MILLIMETER-WAVE SMALL CELLS

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2015/077434, with an international filing date of Apr. 24, 2015. This application is a continuation of International Application No. PCT/CN2015/077434, which is pending as of the filing date of this application, and the United States is a designated state in International Application No. PCT/CN2015/077434. The disclosure of each of the foregoing documents is incorporated herein by reference.

TECHNICAL FIELD

The disclosed embodiments relate generally to wireless communication, and, more particularly, to user plane architecture integrating Millimeter Wave smallcell and microwave macrocell.

BACKGROUND

The upcoming next generation "5G" Millimeter Wave (mmWave) small cell is expected to coexist with microwave (e.g., E-UTRAN) macro cells for a long time. The macro-assisted mmWave cellular systems exploit the fact that mmWave small cells and microwave macro cells may compensate each other very well in coverage area, link capacity, spectrum availability, and service robustness.

The mmWave bands above 10 GHz offer abundant spectrum, possibly at license free or at least efficiently shared, where bands may span contiguously for hundreds of megahertz or even gigahertz. Comparatively, microwave bands below 6 GHz are known for suffering from shortage, known as "bandwidth crunch", and are fragmented bands of tens of megahertz with expensive licensing.

Due to the high carrier frequency, an mmWave system enjoys the natural compactness of RF system design of potentially tens or hundreds of antennas in a very small area, but it also has the physical barriers of poor penetration, small channel coherence time, big propagation loss due to atmosphere gaseous losses and precipitation attenuation. That is why mmWave systems usually need highly directional beamforming techniques to meet the tight link budget even for a small cell coverage. Comparatively, microwave systems have much smaller propagation path loss, and hence wider coverage, but greater multipath dissipation and scattering that may translate to severe inter-cell interference.

Given different channel characteristics, at the radio access system level, mmWave systems may promise gigabit-rate links within limited (small cell) coverage that are yet coupled with challenging beam-tracking and intermittent links in low-to-medium mobility in particular. On the other hand, the legacy microwave systems offer proven record of robust wide-area coverage, e.g., macrocell services even for high mobility users at a service rate of up to hundreds of megabits.

From both network and radio access's perspectives, mmWave is currently considered a very promising choice for in-door or out-of-door "5G" cellular small cells, which may compensate microwave macro-cell in shortage of spectrum or in need for economical high-speed data services. In particular, the small cells offer downlink (DL) throughput boosting or coverage extension for an umbrella macro-cell at its edge. On the other hand, macro-cell coverage makes up mmWave's directional coverage limitation and bursty link disruption by offering reliable omni-directional overlay services for time-critical or mission-critical control signaling, or offering more robust and seamless services for low-rate high-mobility voice users. Together they constitute a layered communication infrastructure that promise reliability, wide coverage, economical yet diversified mobile QoS services.

The gradual deployment of mmWave small cell systems, just as many other previous wireless systems, may initially be standalone Greenfield or macro-assisted hotspots, then clusters of contiguous small cells overlaid on top of existing macro cells, and eventually large scales of dense deployment of mmWave small cells to host many stationary or mobile users, e.g., in stadiums or urban areas under a central controller.

Overall, macro-assisted mmWave small cells demand a scalable multi-RAT integration architecture that affect both UE and networks. Control and data plane shall be separated because they may not always go through the same radio access. Design of control and user plane architecture shall be scalable and consider 5G mmWave deployment scenarios. Clustered or Dense deployment of mmWave small cells under the coverage of a macrocell with the following characteristics are a design focus: UEs are of dual active RFs in mmWave band and microwave bands; no ideal backhaul link between small cell BS (SBS) and macrocell BS (MBS); dense mmWave small cells and UEs under an umbrella microwave macrocell; mmWave smallcell is similar to LTE at upper layers but like a new RAT otherwise at lower layers; and mmWave links offer Gbps rate but with intermittent connectivity.

The existing LTE HetNet Dual Connectivity (DuCo) architecture is not fine-tuned for mmWave small cells that have new radio characteristics and face new 5G requirements as well. The LTE DuCo architecture is designed only for some less dense deployed, relatively low-rate microwave smallcell scenarios, and not optimized for stationary or dense scenarios with Gbps mmWave small cells. A new user plane architecture to integrate mmWave small cells and microwave macro cells effectively is sought.

SUMMARY

A user plane architecture to integrate Millimeter Wave (mmWave) small cells and microwave macro-cells effectively is proposed. The architecture keeps the same underlying hardware (HW) architecture intact, but overlay on top of it multiple logical U-plane architecture setups by on-demand software (SW) configuration. The proposed On-demand Reconfiguration U-Plane Architecture (ORUA) for Macro-assisted mmWave small cells is designed to meet 5G expectations of dense deployment of small cells and UEs and beamformed intermittent Gbps links. Although mmWave small cells may work independently, macro-assisted mmWave systems offer the following potential advantages: more robust mobility support, resilience to mmWave link outage, small-area throughput boosting and wide-area signaling coverage. In light of the 5G expectation and macro-assistance, the deployment scenarios are classified based on density, UE's mobility level, as well as application scenarios and performance requirements. Such criteria helps to evalute any specific system architecture with respect to each specific scenario or all scenarios.

In one embodiment, a UE/base station obtains a user plane (U-plane) setup preference information of the UE in a HetNet having microwave macrocell served by a macro base station (MBS) and overlaying mmWave small cells served by smallcell base stations (SBSs). The UE/base station determines one or more preferred U-plane setups for the UE based on the U-plane setup preference information and based on a performance requirement associated with an application scenario of the UE. The UE/base station performs U-plane setup update according to the one or more preferred U-plane setups.

In one embodiment, the U-plane setup preference information comprises at least one of a network density, a network loading, link quality of the macrocell and small cells, U-plane setup policy, a UE preference, UE context, a UE location, and a UE mobility; a performance requirement comprises a throughput requirement, a latency requirement, a coverage requirement, and a reliability requirement; and an application scenario comprises at least one of a voice or low-rate data application and a high-rate data application. In one example, the UE simultaneously applies multiple U-plane setups at the same time to meet the 5G performance expectations of different applications with different rate/delay.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
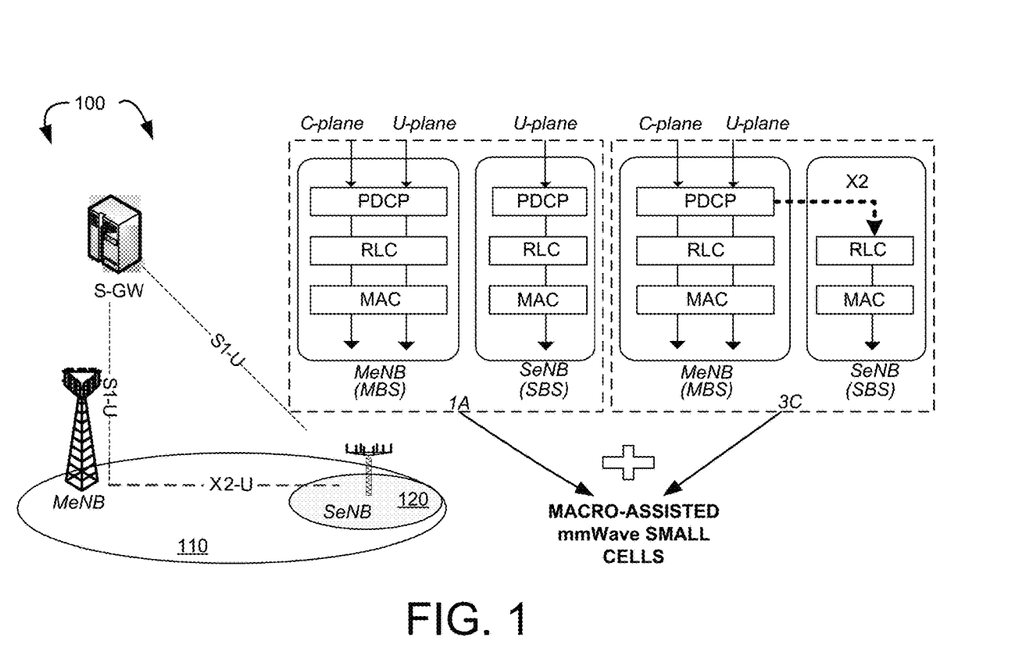
FIG. 1 illustrates Macro-assisted Millimeter Wave (mmWave) small cells in a heterogeneous network (HetNet) with existing LTE HetNet DuCo architecture.

FIG. 1 illustrates Macro-assisted Millimeter Wave (mmWave) small cells in a heterogeneous network (HetNet) 100 with existing LTE HetNet Dual Connectivity (DuCo) architecture. HetNet 100 comprises a macro base station (MeNB or MBS) serving a macrocell 110 and an mmWave smallcell base stations (Secondary eNB (SeNB) or SBS) serving a small cell 120. The mmWave small cell 120 is deployed under the coverage of the macrocell 110. In a typical Clustered or Dense deployment of mmWave smallcell scenario, a cluster of or dense mmWave small cells and UEs (not shown) are under the same umbrella microwave macrocell 110 served by the MBS.

The existing LTE 3GPP HetNet dual connectivity (DuCo) architecture is designed only for less dense deployed, relatively low-rate microwave smallcell scenarios that is not fine-tuned for stationary or dense scenarios with Gbps mmWave small cells. The 3GPP HetNet DuCo defines control-plane and user-plane split with single radio resource control (RRC) for HetNet mobility, and flow/bearer data split. In the example of FIG. 1, according to LTE DuCo user plane architecture, two active data paths are provided, 1A (S-GW flow split) or 3C (DBR bearer split at PDCP/RLC layer, depicted by the dashed line), with which one on non-ideal backhaul (X2) but DBR bearer split from SeNB, and one directly to UE from MeNB. Such U-plane data paths lack of considerations for soft handover (SHO) or multipath diversity (CoMP) for UEs in low mobility across small cell boundaries, and lack of considerations for QoS-specific path selection and configuration.

In accordance with one novel aspect, a control plane and user plane architecture to integrate mmWave small cells and microwave macro cells effectively is proposed. The On-demand Reconfiguration Control-Plane and User-Plane Architecture (ORCA and ORUA) for Macro-assisted Millimeter Wave (mmWave) small cells is designed to meet the next generation 5G expectations of dense deployment of small cells and UEs and beamformed intermittent Gbps links. ORCA and URUA are also designed to meet the E-UTRAN constraints of limited and costly microwave spectrum, limited macrocell processing power, backhaul link, and core network (CN) capacity. Further, ORCA and ORUA are designed to consider the deployment scenarios following classification criteria of connection/UE/cell density, UE mobility level, backhaul quality, and integration with macrocell—macro-assisted mmWave small cells. For example, given the limited processing resources and link capacity with existing E-UTRAN MeNB/MBS, anchoring data path and control functionalities at the MBS, as in existing HetNet DuCo or PDCP-level LTE-WiFi Aggregation, may not scale up gracefully with the 5G expectation of dense connections and small RAN latency, e.g., up to 100 connections/$km^2$ and end-to-end RAN latency as small as 1~5 ms, respectively.

The proposed ORUA revises the LTE DuCo U-plane architecture with scenario-specific and on-demand configurability. The existing data plane of flow split and PDCP bearer split onto macro and small cells are reusable. However, PDCP split at MBS (3C) may be bottlenecked in CPU/memory, being a single failure pint, and incur performance loss of speed/latency given gigabit mmWave link and dense deployments. Under flow split (1A), S2M fallback may cause MBS congestion, without utilize multiple mmWave links and localized traffic. The proposed ORUA reuses exiting LTE DuCo U-plane architecture but is revised to enable simultaneously active 1A and 3C data paths with limited or removed bearer split (in 3C) over X2-U between MBS and SBS. The proposed ORUA minimizes X2-U between MBS and SBS. ORUA supports localization of high-speed traffic between two SBSs without involving MBS. ORUA also provides U-path diversity by supporting multiple U-paths with SBSs being anchor or local traffic or traffic that is too heavy to MBS (e.g., local breakouts or CoMP between SBSs), and by supporting soft handover for UEs moving across neighboring small cells. In addition, UE has the intelligence of dynamic access activation of multiple simultaneous U-paths and U-path selection.

Figure 2A:
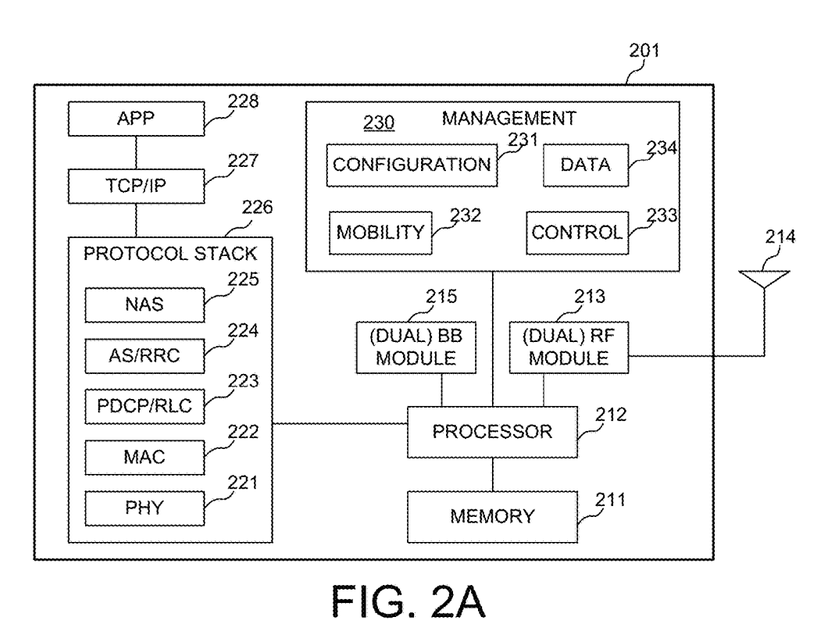
FIG. 2A is a simplified block diagram of a user equipment (UE) that carry certain embodiments of the present invention.

FIG. 2A is a simplified block diagram of a user equipment UE 201 that carry certain embodiments of the present invention. UE 201 has an antenna (or antenna array) 214, which transmits and receives radio signals. A RF transceiver module (or dual RF modules) 213, coupled with the antenna, receives RF signals from antenna 214, converts them to baseband signals and sends them to processor 212 via baseband module (or dual BB modules) 215. RF transceiver 213 also converts received baseband signals from processor 212 via baseband module 215, converts them to RF signals, and sends out to antenna 214. Processor 212 processes the received baseband signals and invokes different functional modules to perform features in UE 201. Memory 211 stores program instructions and data to control the operations of UE 201.

UE 201 also includes a 3GPP protocol stack module 226 supporting various protocol layers including NAS 225, AS/RRC 224, PDCP/RLC 223, MAC 222 and PHY 221, a TCP/IP protocol stack module 227, an application module APP 228, and a management module 230 including a configuration module 231, a mobility module 232, a control module 233, and a data handling module 234. The different circuits and modules are function circuits and modules that can be configured and implemented by software, firmware, hardware, or any combination thereof. For example, each circuit or module may comprise processor 212 plus corresponding software codes. The function circuits and modules, when executed by processor 212 (via program instructions and data contained in memory 211), interwork with each other to allow UE 201 to perform certain embodiments of the present invention accordingly. Configuration module 231 obtains U-plane setup preference information, mobility module 232 determines UE mobility based on UE speed, movement, and cell count, control module 233 determines and applies a preferred U-plane setup for the UE dynamically, and data handling module 234 performs corresponding U-path setup activation and selection.

Figure 2B:
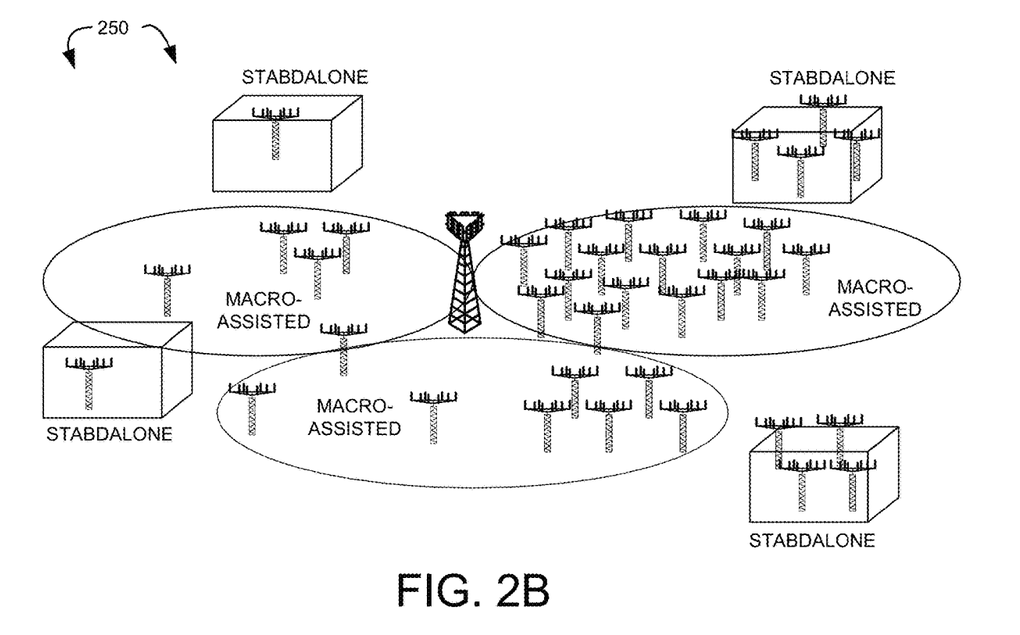
FIG. 2B illustrates mmWave smallcell deployment scenarios with ORUA.

FIG. 2B illustrates mmWave smallcell deployment scenarios with ORUA in HetNet 250. As illustrated in FIG. 2B, HetNet 250 comprises standalone mmWave small cells as well as macro-assisted mmWave small cells. Although mmWave small cells may work independently, macro-assisted mmWave systems offer many potential advantages. Under the proposed ORUA, the general assumption is that E-UTRAN and 5G may coexist for a long time. The macro-assisted mmWave concept is to exploit the fact that mmWave and microwave wireless coverage may compensate each other well. Examples of 5G requirements are: Ultra Dense Network with high-density of small cells, users per cell, and connections per area, e.g., up to 100 connections/$km^2$, with traffic density up to 10 Tbps/$km^2$; Reduced latency with end-to-end RAN delay as small as 1~5 ms; mobility of 500 km/hour; Gbps rate user experienced throughput; Rich applications with context-aware diverse QoSs and different mobility levels; and Multi-RAT support with backward compatibility and forward scalability, and multi-mode RFs at UE and BS. Generally, 5G is expected to offer 50× times more spectrum, 20× times of more density, and 10× times of higher efficiency. So far only mmWave bands can meet the first expecatation.

While E-UTRAN and 5G may coexist for long, C-RAN type of Greenfield architecture may be adopted in a long run. A flexible U-plane architecture is needed that can integrate the former yet evolve into the latter conveniently. Operators cannot afford a static yet inefficient architecture, nor an ever-changing architecture particularly with ever-changing HW (UE, RAN, and EPC equipment) requirements. Operators want to have one set of HW that supports all scenarios and even futuristic scenarios at affordable cost (CAPEX/OPEX), yet offering customized data services for individual users→Flattened data plane network (to reduce the end-to-end RAN delay~1 ms), CoMP, localized traffic, edge intelligence. Further, C-plane and U-plane separation offers flexibility, but different mmWave deployment scenarios and different application/traffic demand for different U-plane architectures (e.g., SRVCC/CSFB before VoLTE). 5G mmWave small cell may show up as a new RAT to integrate into E-UTRAN for DL throughput boosting and low-cost spectrum exploitation. Different setups of a flexible U-plane architecture are thus needed.

Figure 3:
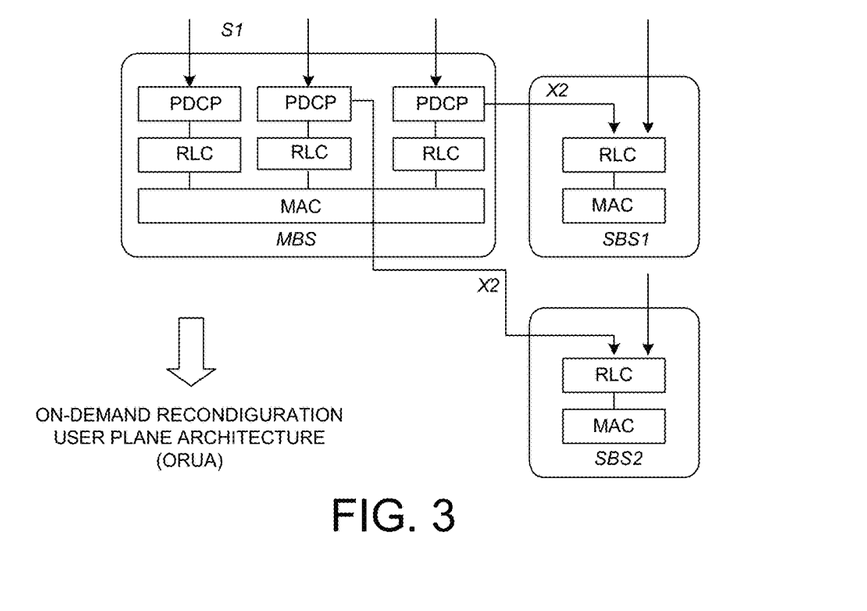
FIG. 3 illustrates an existing LTE DuCo U-plane architecture from protocol layers that can be revised to a flexible U-plane architecture.

FIG. 3 illustrates an existing LTE DuCo U-plane architecture from protocol layers that can be revised to a flexible U-plane architecture. As illustrated in FIG. 3, The U-plane architecture borrows ideas from 3GPP-WiFi integration and LTE DuCo, which enhances LTE DuCo U-plane architecture for newly or gradually deployed mmWave small cells with scenario-specific configuration setup and UE-centric and application specific architecture setup configuration using access and path selection algorithms. The proposed ORUA keeps the same underlying HW architecture intact as in E-UTRAN, but overlay on top of DuCo more U-plane architecture setups by on-demand software configuration.

For each U-plane setup scenario, either the UE or the network operator may trigger SW (re)configuration of the U-plane architecture setup based on real-time needs, context/load situations, and UE capability. The same UE may see multiple different logical U-plane architecture setups active at the same moment but corresponds to different applications/scenarios. Different UEs that have different (mobility, load, or context) scenarios may be configured with different logical architecture setups even if they are served by the same physical entities (MBS, SBS, MME/EPC, etc.) For each architecture setup, there could be further refined U-Plane RRM functional split between the underlying network entities. For the future mmWave deployment scenarios or evolving macrocell E-UTRAN HW, the proposed on-demand architecture may also evolve accordingly without incurring extra CAPEX/OPEX. For example, ORUA may evolve into C-RAN type of architecture easily, as C-RAN type of configuration becomes one of the embodiments of the U-plane architecture setup under ORUA. In the flexible U-plane architecture, data path can be activated as needed, on-demand, or scenario-based. Different U-plane setups can be combined, or used individually, or triggered based on 5G requirements and applications/scenarios.

Figure 4:
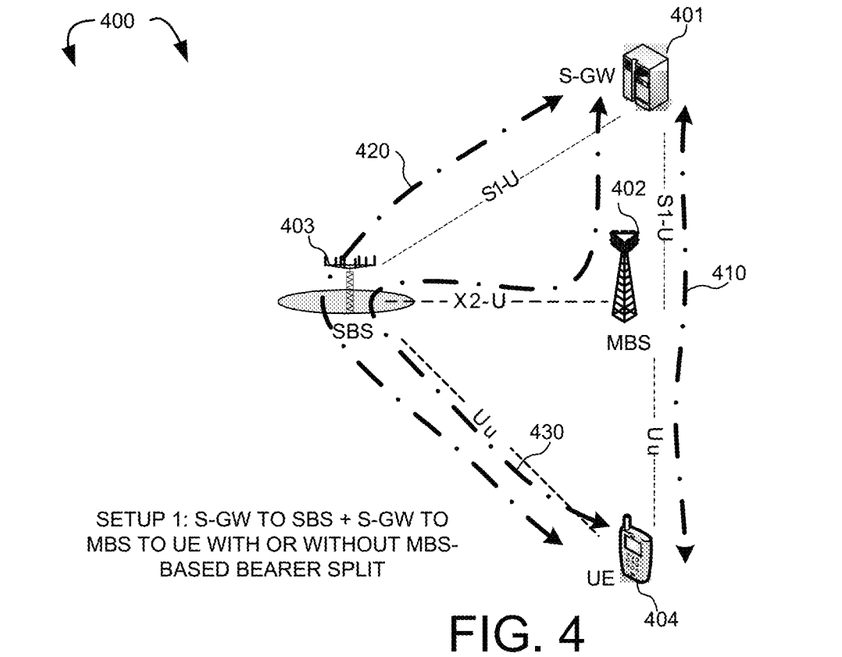
FIG. 4 illustrates a first U-Plane setup under a first network deployment scenario.

FIG. 4 illustrates a first U-Plane setup (Setup 1) under a first network deployment scenario in HetNet 400. HetNet 400 comprises a serving gateway S-GW 401, a macro base station MBS 402, a smallcell base station SBS 403, and a user equipment UE 404. Setup 1 is similar to simultaneously active 1A and 3C as in LTE DuCo, which can be considered as one embodiment of the proposed flexible U-plane architecture, but with de-emphasized X2-U (PDCP bearer split) between MBS 402 and SBS 403. The S-GW 401 to SBS 403 to UE 404 data path (as depicted by line 420), plus the S-GW 401 to MBS 402 to UE 404 data path, without MBS-bearer-based bearer-split (as depicted by line 410). MBS-based bearer split (from S-GW 401, to MBS 402, to SBS 403, and to UE 404, as depicted by line 430) could be used during high mobility for low rate traffic, but still with caution. Setup 1 provides multiple diversity paths between MBS and SBS to meet 5G expectations of different application with different rate/delay. For example, real-time voice by MBS 402 to UE 404 is provided for low-rate stable connections even in mobility (as depicted by line 410), while high-speed data from S-GW 401 to SBS 402 is provided for stationary UEs of high rate expectation (as depicted by line 420). In addition, on-demand path selection and load balancing stationary UEs may prefer path through SBS than MBS, or MBS (bearer-split or not) during high mobility for low rate traffic.

Figure 5:
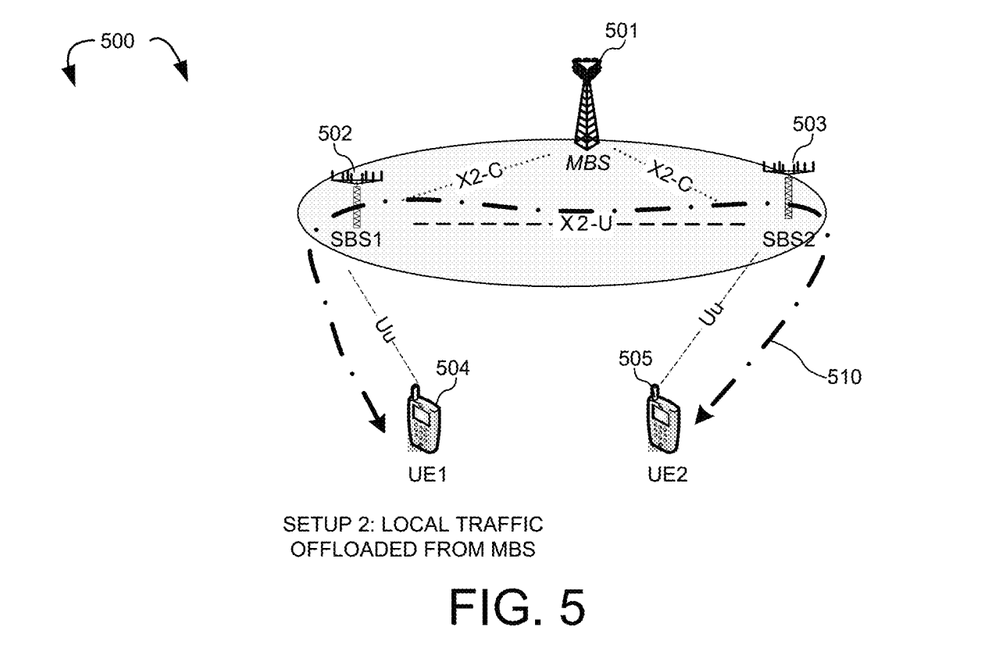
FIG. 5 illustrates a second U-Plane setup under a second network deployment scenario.

FIG. 5 illustrates a second U-Plane setup (Setup 2) under a second network deployment scenario in HetNet 500. HetNet 500 comprises a macro base station MBS 501, a first smallcell base station SBS1 502, a second smallcell base station SBS2 503, a first UE1 504, and a second UE2 505. Setup 2 is similar to WiFi DLS (Direct Link Service), or LTE LIPA/SIPTO with or without local S-GW to localize (Gbps) data traffic between SBS1 and SBS2. Setup 2 supports local traffic breakout between S2S, particularly for stationary deployments. Setup 2 provides a workaround for the bottleneck or single-point failure issue with existing MBS or S-GW for 5G dense connectivity, because local data traffic between UE1 and UE2 are offloaded from MBS 501 (as depicted by line 510).

Figure 6:
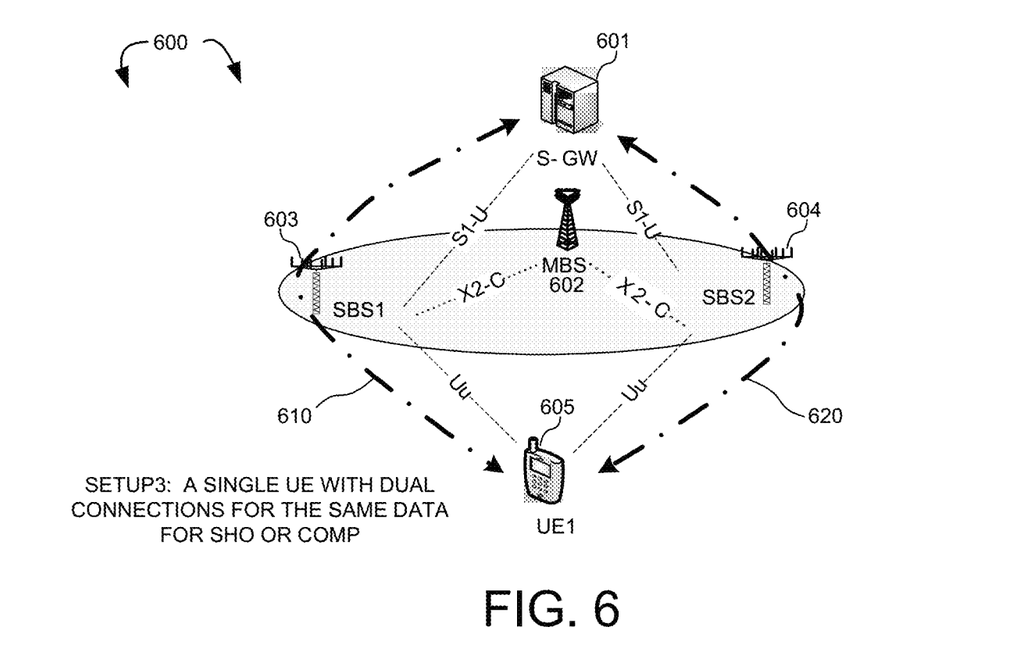
FIG. 6 illustrates a third U-Plane setup under a third network deployment scenario.

FIG. 6 illustrates a third U-Plane setup (Setup 3) under a third network deployment scenario in HetNet 600. HetNet 600 comprises a serving gateway S-GW 601, a macro base station MBS 602, a first smallcell base station SBS1 603, a second smallcell base station SBS2 604, and a user equipment UE 605. Setup 3 provides a flattened network to enable the same data traffic from/to the same UE, through multiple SBSs, to/from one and only one central processor (e.g., S-GW 601, or futuristic BBU as in C-RAN). This is beneficial particularly when the UE is moving slowly between two neighboring small cells (e.g., SHO scenario), or when UE is at the edge of the two neighboring small cells (e.g., CoMP scenario). The multiple path diversity between SBS1 and SBS2 (as depicted by line 610 and line 620) enables SHO (which is feasible as mmWave spectrum is abundant and low cost, also one mmWave link is not as stable) or CoMP with flattened network of one central processor S-GW 601. In an alternative example, the dual connections in U-plane setup 3 may be used for sending and receiving different data to the same UE. Further, such dual connections may be established between different MBSs as well as SBSs.

Figure 7:
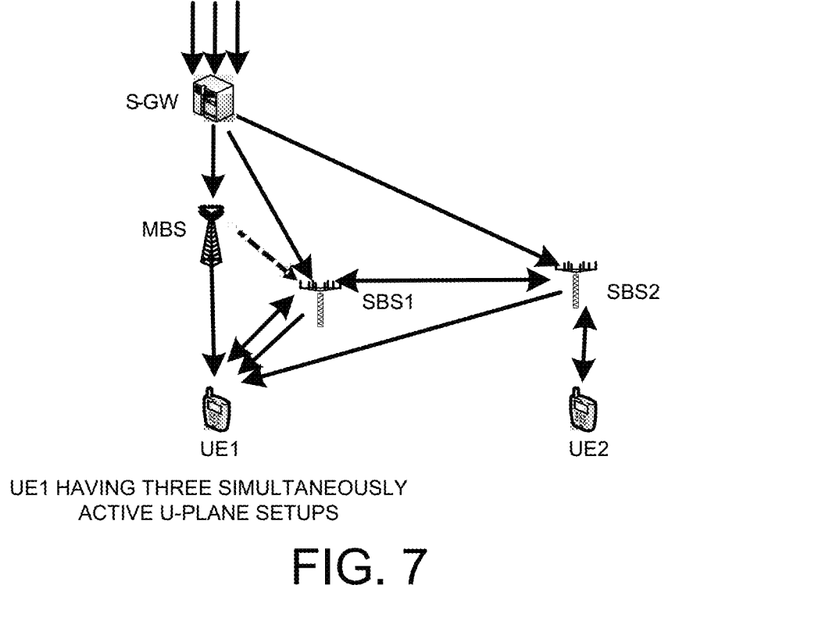
FIG. 7 illustrates a logical view of an example of a UE having multiple simultaneously active U-Plane setups.

FIG. 7 illustrates a logical view of an example of a UE having multiple simultaneously active U-Plane setups in a HetNet. The HetNet comprises an S-GW, an MBS, an SBS1 and SBS2, and a UE1 and UE2. Based on 5G requirements of data throughput and delay, UE1 may apply all three U-plane architecture setups simultaneously based on the network deployment scenario and the UE application scenario. In the example of FIG. 7, UE1 applies U-plane setup 1 with MBS and SBS1 as illustrated in FIG. 4, e.g., UE1 has multiple data path diversity between MBS and SBS1 for different mobility and application scenarios. UE1 also applies U-plane setup 2 with SBS1 and SBS2 as illustrated in FIG. 5, e.g., the local data traffic between UE1 and UE2 are provided via SBS1 and SBS2 directly without MBS in dense deployment scenario. UE1 further applies U-plane setup 3 with SBS1 and SBS2 as illustrated in FIG. 6, e.g., the same data for UE1 through both SBS1 and SBS2 to/from S-GW enables SHO and CoMP to meet rate/latency requirement in low mobility.

Figure 8:
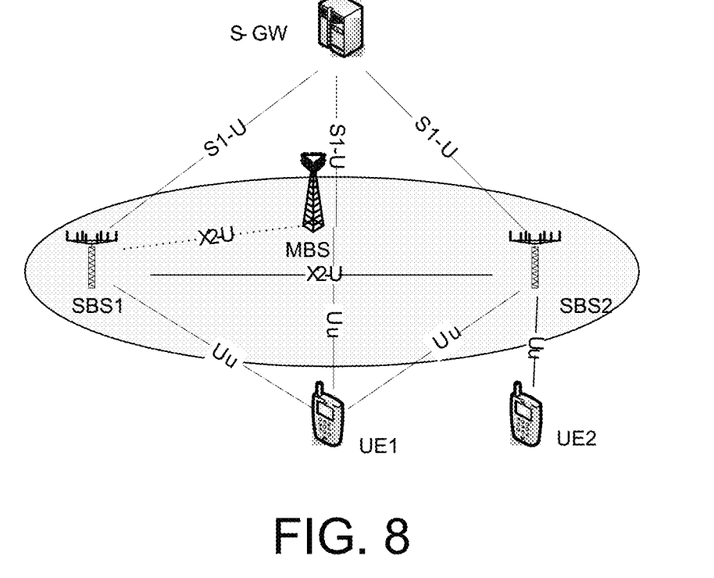
FIG. 8 illustrates a system view of an example of a UE having multiple simultaneously active U-Plane setups.

FIG. 8 illustrates a system view of an example of a UE having multiple simultaneously active U-Plane setups in a HetNet. The HetNet comprises an S-GW, an MBS, an SBS1 and SBS2, and a UE1 and UE2. The example in FIG. 8 is the same as the example in FIG. 7. FIG. 8 explicitly depicts the various user plane interfaces between S-GW, MBS, SBS1, SBS2, UE1, and UE2.

Figure 9:
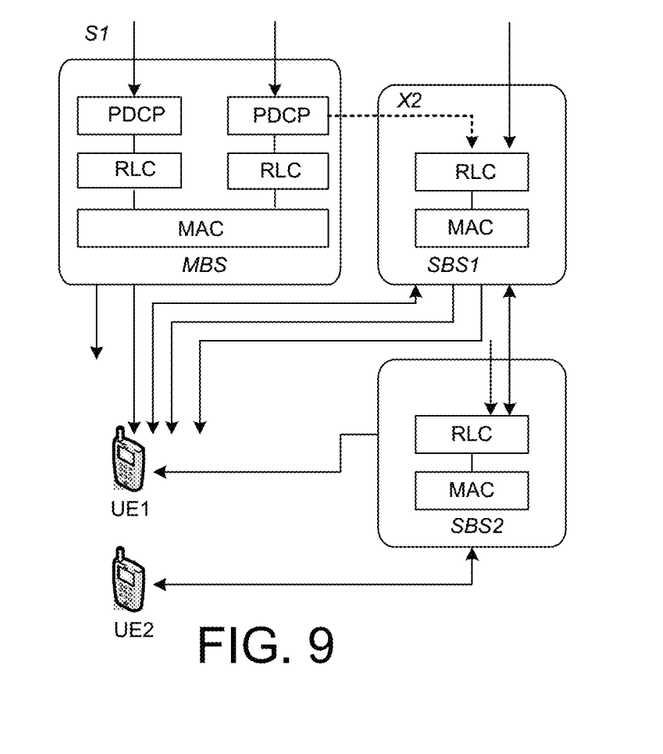
FIG. 9 illustrates a protocol layer view of an example of a UE having multiple simultaneously active U-Plane setups.

FIG. 9 illustrates a protocol view of an example of a UE having multiple simultaneously active U-Plane setups in a HetNet. The HetNet comprises an MBS, an SBS1 and SBS2, and a UE1 and UE2. The example in FIG. 9 is the same as the example in FIG. 7. FIG. 9 explicitly depicts the protocol layer of MBS, SBS1, and SBS2 for simultaneously supporting the various U-plane setups for both UE1 and UE2.

Figure 10:
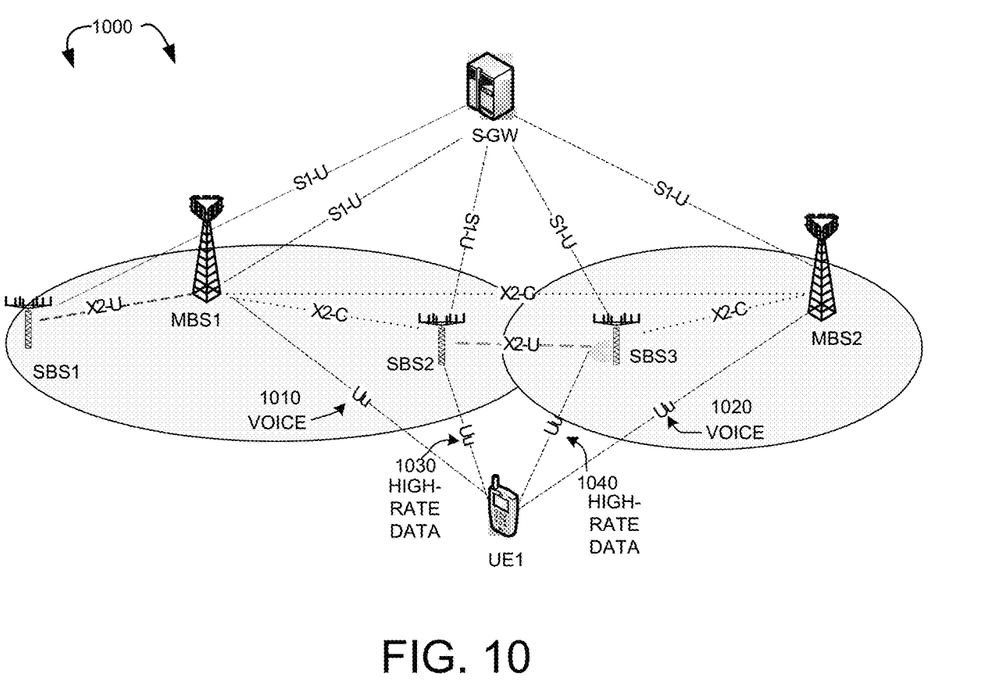
FIG. 10 illustrates one embodiment of a flexible U-plane architecture when UE crossing the boundary of neighboring small cells and macro cells.

FIG. 10 illustrates one embodiment of a flexible U-plane architecture when UE crossing the boundary of neighboring small cells and macro cells in HetNet 1000. HetNet 1000 comprises a serving gateway S-GW, two macro base stations MBS1, MBS2, three smallcell base stations SBS1, SBS2, SBS3, and a user equipment UE1. UE1 moves crossing the boundary of neighboring small cells served by SBS2 and SBS3, as well as macro cells served by MBS1 and MBS2. Under such network deployment scenario, voice and low-rate data traffic is parked on MBS1 and MBS2 with diversity regardless of mobility speed, as depicted by line 1010 and 1020. Note that is similar to Setup 1 and like setup 3 (but for MBS voice). On the other hand, high-rate data traffic is parked on SBS2 and SBS3 with diversity for low mobility speed, as depicted by line 1030 and 1040. Note that this is similar to Setup 3. The context switching across X2-C involving MBSs, while data path activation and configurations could be controlled by MBSs with the help of MME and SBSs. DBRs and data connections are setup before handover across the boundary for SHO and robustness. Data forwarding may be done accordingly for both voice/low-rate data traffic and high-rate data traffic. For example, for high-rate date at low mobility, there could be multiple choices. First, IP flow-level forwarding from/to the S-GW: active dual links for the same packet data flow could be combined and re-ordered at the receiver. Second, physical/carrier-level forwarding from/to the S-GW: active dual data links for the dame data could trigger PHY-layer CoMP between SBS1 and SBS2 as centrally controlled by the S-GW.

Figure 11:
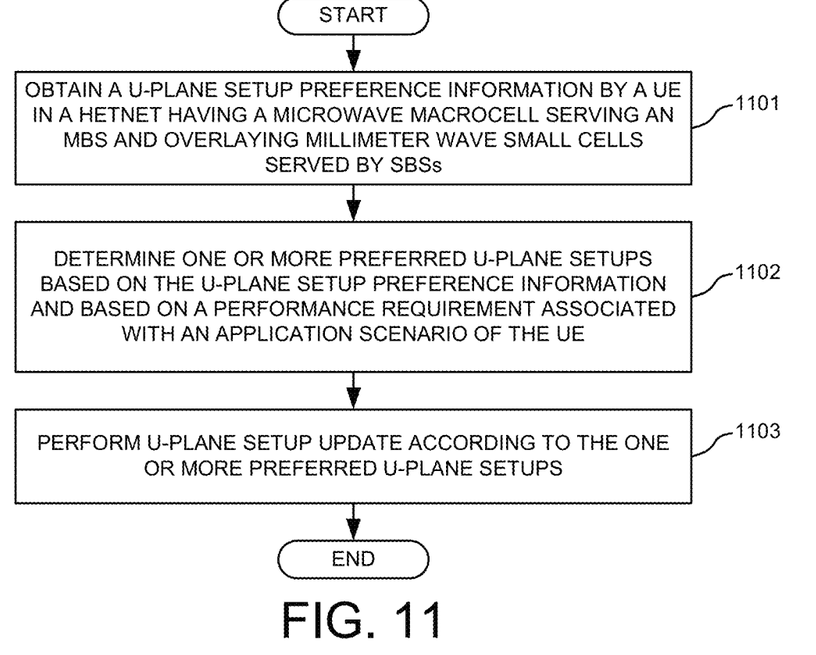
FIG. 11 is a flow chart of a method of ORUA for Macro-assisted Millimeter Wave (mmWave) small cells from UE perspective in accordance with one novel aspect.

FIG. 11 is a flow chart of a method of ORUA for Macro-assisted Millimeter Wave (mmWave) small cells from UE perspective in accordance with one novel aspect. In step 1101, a UE obtains a user plane (U-plane) preference information in a HetNet having microwave macrocell served by a macro base station (MBS) and overlaying small cells served by smallcell base stations (SBSs). In step 1102, the UE determines one or more preferred U-Plane setups based on the U-plane setup preference information and based on a performance requirement associated with an application scenario of the UE. In step 1103, the UE performs U-plane setup update according to the one or more preferred U-plane setups. In one embodiment, the U-plane setup preference information comprises at least one of a network density, a network loading, link quality of the macrocell and small cells, U-plane setup policy, a UE preference, UE context, a UE location, and a UE mobility; a performance requirement comprises a throughput, a latency, a coverage, and a reliability requirement; and an application scenario comprises at least one of a voice or low-rate data application and a high-rate data application. In one example, the UE simultaneously applies multiple U-plane setups at the same time to meet the 5G performance expectations of different applications with different rate/delay.

Figure 12:
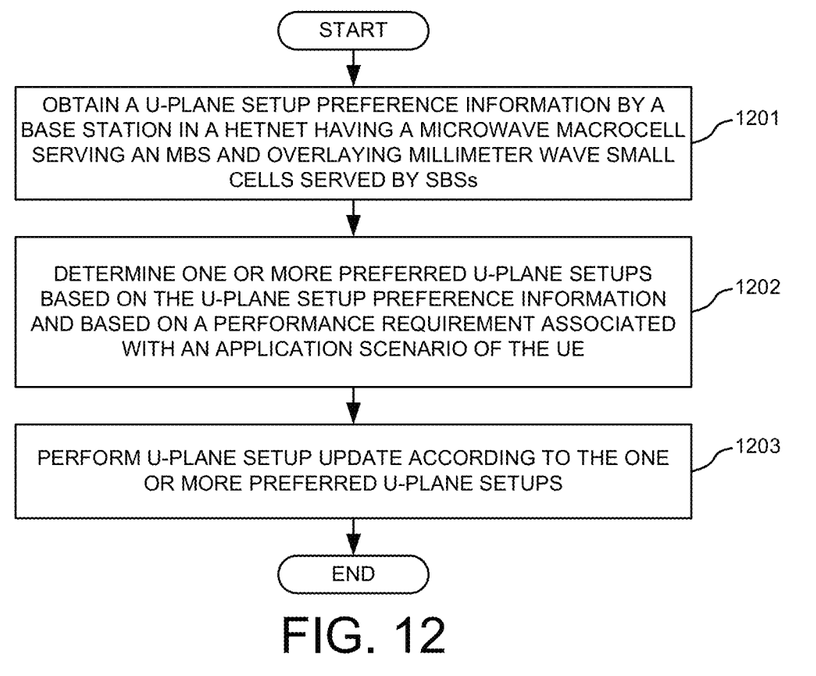
FIG. 12 is a flow chart of a method of ORUA for Macro-assisted Millimeter Wave (mmWave) small cells from network perspective in accordance with one novel aspect.

FIG. 12 is a flow chart of a method of ORUA for Macro-assisted Millimeter Wave (mmWave) small cells from network perspective in accordance with one novel aspect. In step 1201, a base station obtains a user plane (U-plane) preference information of a user equipment (UE) in a HetNet having microwave macrocell served by a macro base station (MBS) and overlaying small cells served by smallcell base stations (SBSs). In step 1202, the base station determines one or more preferred U-Plane setups for the UE based on the U-plane setup preference information and based on a performance requirement associated with an application scenario of the UE. In step 1203, the base station performs U-plane setup update according to the one or more preferred U-plane setups. In one embodiment, the U-plane setup preference information comprises at least one of a network density, a network loading, link quality of the macrocell and small cells, U-plane setup policy, a UE preference, UE context, a UE location, and a UE mobility; a performance requirement comprises a throughput, a latency, a coverage, and a reliability requirement; and an application scenario comprises at least one of a voice or low-rate data application and a high-rate data application. In one example, multiple U-plane setups are applied to the UE at the same time to meet the 5G performance expectations of different applications with different rate/delay.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
obtaining a user plane (U-plane) setup preference information of a user equipment (UE) by a network device in a heterogeneous network (HetNet) having a microwave macrocell serving by a macro base station (MBS) and overlaying Millimeter Wave (mmWave) small cells served by small cell base stations (SBSs);
determining one or more preferred U-plane setups for the UE based on the U-plane setup preference information and based on a performance requirement associated with an application scenario of the UE; and
performing U-plane setup update applying on-demand reconfiguration U-plane architecture (ORUA) according to the one or more preferred U-plane setups, wherein the one or more preferred U-plane setups comprising utilizing multiple mmWave links simultaneously for U-plane, activating packet data convergence protocol (PDCP) split data path and flow split data path simultaneously, localizing high-speed traffic between SBSs, and supporting multiple U-paths with SBSs.

2. The method of claim 1, wherein a U-plane setup comprises establishing a U-plane connection for data transmission with one or more base stations.

3. The method of claim 1, wherein the U-plane setup preference information comprises at least one of a network density, a network loading, link quality of the macrocell and small cells, U-plane setup policy, a UE preference, UE context, a UE location, and a UE mobility.

4. The method of claim 1, wherein a performance requirement comprises at least one of a throughput requirement, a latency requirement, a coverage requirement, and a reliability requirement.

5. The method of claim 1, wherein the application scenario comprises at least one of a voice or low-rate data application and a high-rate data application.

6. The method of claim 1, wherein a first U-plane setup is applied, and wherein the UE establishes multiple data paths with the MBS and one or more SBSs.

7. The method of claim 1, wherein the UE is stationary, and wherein a second U-plane setup is applied for the UE, and wherein the UE exchanges data traffic with a second UE without going through a serving gateway.

8. The method of claim 1, wherein a third U-plane setup is applied for the low-to-medium mobility UE, and wherein the UE establishes dual data connections with two smallcell base stations for transmitting and receiving the same data at the same time.

9. The method of claim 1, wherein the UE simultaneously applies multiple U-plane setups at the same time.

10. The method of claim 1, wherein the U-plane setup is applied via software configuration based on the same set of hardware in the network.

11. The method of claim 1, wherein the network device is the user equipment.

12. The method of claim 1, wherein the network device is the macro base station.

13. A network device, comprising:
a configuration module that obtains a user plane (U-plane) setup preference information of a user equipment (UE) in a heterogeneous network (HetNet) having a microwave macrocell serving by a macro base station (MBS) and overlaying Millimeter Wave (mmWave) small cells served by small cell base stations (SBSs);
a control module that determines one or more preferred U-plane setups for the UE based on the U-plane setup preference information and based on a performance requirement associated with an application scenario of the UE; and
a data-handling module that performs U-plane setup update applying on-demand reconfiguration U-plane architecture (ORUA) according to the one or more preferred U-plane setups, wherein the one or more preferred U-plane setups comprising utilizing multiple mmWave links simultaneously for U-plane, activating packet data convergence protocol (PDCP) split data path and flow split data path simultaneously, localizing high-speed traffic between SBSs, and supporting multiple U-paths with SBSs.

14. The device of claim 13, wherein a U-plane setup comprises establishing a U-plane connection for data transmission with one or more base stations.

15. The device of claim 13, wherein the U-plane setup preference information comprises at least one of a network density, a network loading, link quality of the macrocell and small cells, U-plane setup policy, a UE preference, UE context, a UE location, and a UE mobility.

16. The device of claim 13, wherein a performance requirement comprises at least one of a throughput requirement, a latency requirement, a coverage requirement, and a reliability requirement.

17. The device of claim 13, wherein the application scenario comprises at least one of a voice or low-rate data application and a high-rate data application.

18. The device of claim 13, wherein a first U-plane setup is applied, and wherein the UE establishes multiple data paths with the MBS and one or more SBSs.

19. The device of claim 13, wherein the UE is stationary, and wherein a second U-plane setup is applied for the UE, and wherein the UE exchanges data traffic with a second UE without going through a serving gateway.

20. The device of claim 13, wherein a third U-plane setup is applied for the low-to-medium mobility UE, and wherein the UE establishes dual data connections with two smallcell base stations for transmitting and receiving the same data at the same time.

21. The device of claim 13, wherein the UE simultaneously applies multiple U-plane setups at the same time.

22. The device of claim 13, wherein the U-plane setup is applied via software configuration based on the same set of hardware in the network.

* * * * *